T. E. BARNUM.
MOTOR CONTROLLER.
APPLICATION FILED JUNE 1, 1909.
1,121,786.
Patented Dec. 22, 1914.
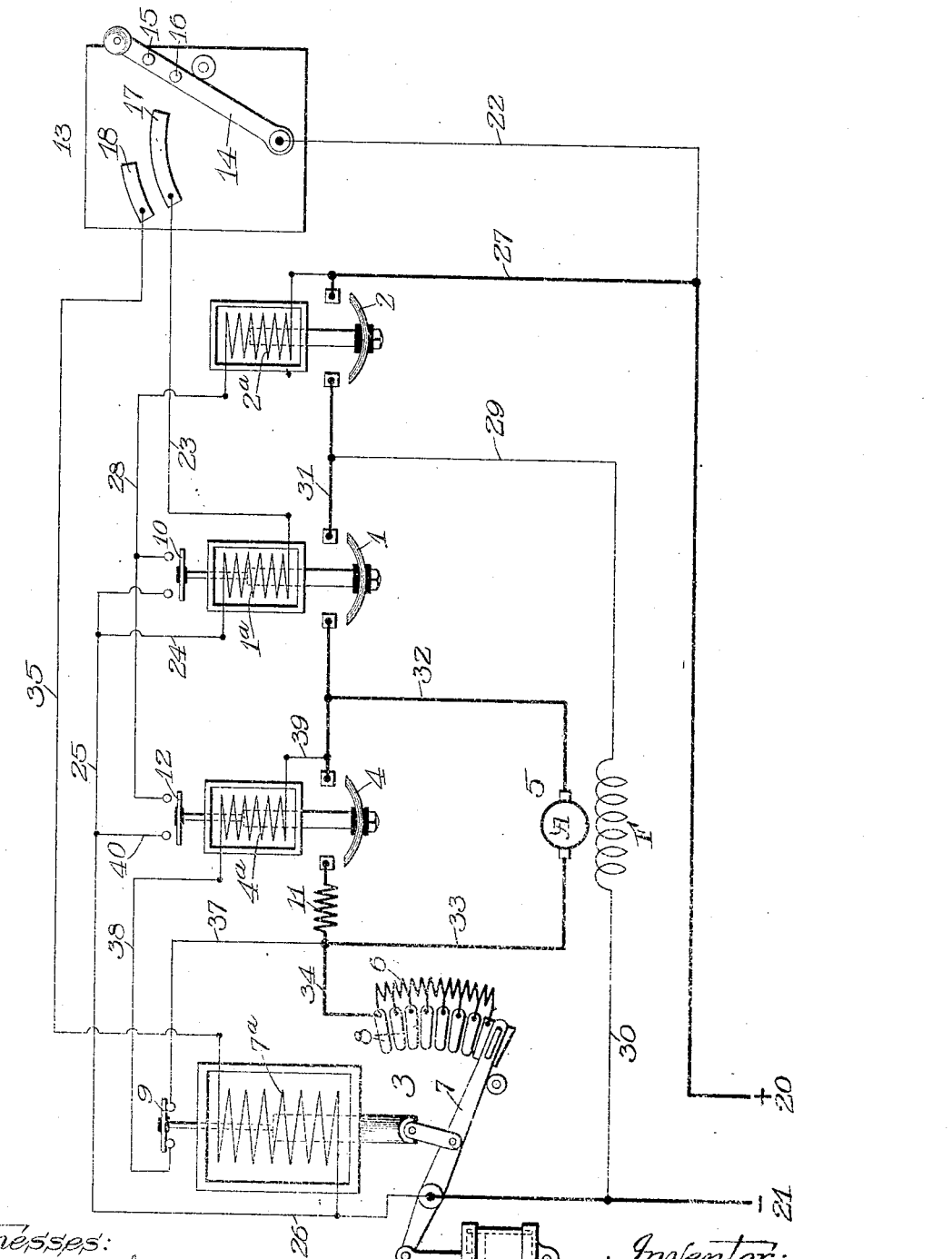
Witnesses:
George Haynes
S. W. Fitzgerald
Inventor:
Thomas E. Barnum
By Edwin R. H. Tower
Atty.

of the motor 5 which, as illustrated, is provided with an armature A and a shunt field winding F. Although I have shown a plain shunt wound motor, it should be understood that certain features of my invention are equally as applicable to compound motors. The device 3 in the present instance is merely employed for controlling a starting resistance 6 in the armature circuit of the motor. This device comprises a pivoted element 7, having an operating winding 7ª adapted to move the same over a series of contacts 8 to gradually remove the resistance 6 from circuit. It should be understood, however, that I may use an automatic speed controlling device in conjunction with the automatic starting device, or that I might employ a combined starting and speed regulating device in lieu of the starting device illustrated. The plunger of the operating winding 7ª is preferably provided with a tail rod carrying a contact disk 9 adapted to engage a pair of stationary contacts when the controlling element 7 is in initial position. I also preferably provide the main switch 1 with an auxiliary contact disk 10 adapted to engage a pair of stationary contacts when the main switch 1 is closed. The purpose of these auxiliary contact disks will be hereinafter clearly and fully set forth.

The dynamic braking switch 4, as will be hereinafter set forth, is adapted to complete a closed loop across the terminals of the motor armature including a resistance 11. This switch is provided with an operating winding 4ª and is also preferably provided with an auxiliary contact disk 12 adapted to engage a pair of stationary contacts when said switch 4 is closed for the purpose hereinafter set forth.

For controlling the circuits of the operating windings of the several switches to start and stop the motor, I have shown a master switch 13. This master switch may, in practice, be of any preferred type and arranged at a distance from the several switches. As illustrated, the master switch 13 comprises a pivoted element 14 provided with contact brushes 15 and 16. When the member 14 is moved to the left from initial position, the brush 16 first engages a contact segment 17 and then the brush 15 engages a contact segment 18. The motor and the operating windings of the several switches are supplied with current from main lines 20 and 21.

I shall now describe the operation of the controller, at the same time clearly explaining the circuit connections therefor. Assuming the master switch and the several electroresponsive switches to be in the position illustrated, no current will flow through either the motor armature or shunt field winding. To start the motor, the movable element 14 of the master switch should be moved to the left, thus bringing the contact brush 16, carried thereby, into engagement with the contact segment 17. This completes a circuit from main line 20 by conductor 22, through the arm 14 of the master switch, to contact segment 17, by conductor 23 through the operating winding $1^a$ of main switch 1, by conductors 24, 25 and 26 to main line 21. This completes the circuit of the winding $1^a$, which thereupon responds and closes the switch 1. Closure of the switch 1, however, does not immediately close the motor circuit, inasmuch as the motor circuit is interrupted at the switch 2. However, upon closure of switch 1, contact disk 10, operated thereby, is moved into engagement with its stationary contacts. This closes a circuit from main line 20 by conductor 27, through the operating winding $2^a$ of the auxiliary switch 2, by conductor 28, through the auxiliary contact disk 10, to conductor 25, and thence back to the negative side of the main line. The winding $2^a$ then responds, thereby closing the switch 2. Closure of the switch 2 completes both the armature circuit and the shunt field circuit of the motor. The latter may be traced from conductor 27, through switch 2, by conductor 29, through the shunt field winding F, by conductor 30 to the negative side of the main line. The armature circuit may be traced from conductor 27, through the switch 2, by conductor 31, through switch 1, by conductor 32, through the motor armature A, by conductors 33 and 34, through all of the starting resistance 6, thence through the controlling element 7 to the negative side of the main line. The motor will thereupon start with all of the starting resistance in circuit. It should here be noted that with the arrangement which I have provided, it is impossible for the armature circuit to be completed until the circuit of the shunt field winding is also completed. If such provision was not made, the armature might be energized without energizing the shunt field winding. This as is well known, establishes a dangerous condition in the motor. To bring the motor up to normal speed, the member 14 of the master switch should be moved so as to cause the brush 15 to engage a contact segment 18. This completes a circuit from the member 14 to contact segment 18, thence by conductor 35, through the operating winding $7^a$ of the starting device to the negative side of the main line. The winding $7^a$ being thus energized draws up the controlling member 7, thereby removing the resistance from the armature circuit. When all of the resistance 6 has been removed from circuit, the motor will operate at normal speed. As has been previously set forth, the device 3 might be provided to control a regulating resistance instead of a starting resistance. The motor having now been brought up to normal speed, will continue to operate until the controlling member of the master switch is moved toward initial position. Upon the brush 15 leaving contact segment 18, the circuit of the winding $7^a$ is opened, thereby releasing the controlling element 7, which then descends, to gradually reinsert the resistance 6 in the armature circuit. This, of course, slows down the motor. When the member 7 reaches the initial position, the auxiliary contact 9 of the device 3 is brought into engagement with its stationary contacts. The contact disk 9 thereupon connects the operating winding $4^a$ of the dynamic braking switch directly across the terminals of the motor armature. The circuit of this winding may be traced from one terminal of the motor armature by conductors 33 and 37 through the contact disk 9, by conductor 38, through the winding $4^a$, by conductors 39 and 32 to the opposite terminal of the motor armature. The winding $4^a$ will thus be rendered responsive to the C. E. M. F. of the motor armature, and, when energized, closes the switch 4. Closure of the switch 4 completes a closed loop across the terminals of the motor armature which may be traced from one terminal thereof by conductor 33, through the resistance 11, switch 4, by conductor 32 to the opposite terminal of the motor armature. The establishment of this circuit diverts part of the flow of current from the motor armature as long as the same is connected to the main line, and at the same time constitutes a dynamic braking circuit if the motor is driven under the impetus acquired by its load. Of course, after the dynamic braking circuit has been established, the motor armature may be disconnected from the supply circuit. However, in order for the motor to generate a dynamic braking current, it is necessary to maintain the field of the motor energized. To disconnect the motor armature from circuit, the master switch should be so moved as to disengage the brush 16 from the contact segment 17. This, of course, opens the circuit of the winding $1^a$ which releases the switch 1. The opening of the switch 1, of course, opens the armature circuit and would, at the same time, open the circuit of the winding 2ª of the auxiliary switch 2, but for the fact that upon closure of the dynamic braking switch 4, the contact disk 12, operated thereby, is moved into engagement with its stationary contacts. Closure of the auxiliary switch 12 completes a maintaining circuit for the winding 2ª in parallel to the auxiliary contact disk 10 of the main switch 2. This maintaining circuit may be traced from conductor 28, through the auxiliary contact disk 12 of the dynamic braking switch, by conductor 40 to conductor 25. With this arrangement, when the dynamic braking circuit has been closed, movement of the master switch to initial position will cause the motor armature to be disconnected from the supply source while the shunt field winding will be maintained energized. As soon as these conditions are established, the motor will be quickly brought to rest under the influence of the dynamic braking current generated thereby. Of course, as the motor armature slows down, the current generated thereby decreases until finally insufficient current is generated to maintain the winding of the dynamic braking switch energized. The switch 4 thereupon opens, and, immediately upon opening, moves the auxiliary contact disk 12 out of engagement with its stationary contact. This, of course, interrupts the circuit of the operating winding of the auxiliary main switch 2, which thereupon opens to disconnect the shunt field winding F from the supply source. Hence, when the motor comes to rest, it is completely disconnected from the supply source. Of course, if after being slowed down by the reinsertion of the starting resistance, the motor does not generate a sufficient C. E. M. F. to cause the operating winding of the dynamic braking switch to respond, then, as soon as the master switch is moved to initial position, both the main switch 1 and the auxiliary switch 2 will open, thereby interrupting the circuits of both the motor armature and shunt field winding.

While I have shown means for opening the circuit of the shunt field winding of the motor I might utilize the switch 2 for weakening the shunt field without interrupting its circuit if desired. Accordingly in speaking of disconnecting the shunt field winding from circuit I contemplate either weakening the shunt field winding or opening the circuit thereof whichever may be preferred.

Having thus described my invention, what I claim as new and desire to secure by Letters Patent, is:—

1. In a controller for an electric motor having a shunt field winding, in combination, means for automatically varying the connections of the shunt field of the motor upon starting and stopping and means for establishing a dynamic braking circuit to stop the motor, said first mentioned means insuring a strong shunt field upon initial closure of the circuit of the motor armature in starting the motor and also during the dynamic braking period.

2. In a controller for an electric motor having a shunt field winding, in combination, electroresponsive means for varying the connections of the shunt field of the motor upon starting and stopping and means for establishing a dynamic braking circuit for the motor, said electroresponsive means insuring a strong shunt field upon initial closure of the circuit of the motor armature in starting and also during the dynamic braking period.

3. In a controller for an electric motor having a shunt field winding, in combination, electroresponsive means for varying the connections of the shunt field of the motor in starting and stopping and positively insuring a strong field in starting and electroresponsive means for establishing a dynamic braking circuit for the motor and controlling said first mentioned means to insure a strong field during the dynamic braking period.

4. In a controller for electric motors, in combination, an electroresponsive switch for controlling the continuity of the circuit of the shunt field winding of the motor, means for controlling the circuit of the operating winding of said switch, means for establishing a dynamic braking circuit for the motor, and automatic means for establishing a maintaining circuit for the operating winding of said switch, independent of said controlling means, upon the establishment of the dynamic braking circuit.

5. In a controller for electric motors, in combination, means controllable from a distant point for controlling both the armature circuit and the shunt field circuit of the motor, said means tending to open the shunt field circuit upon the opening of the armature circuit, and means for establishing a dynamic braking circuit for the motor and maintaining the shunt field winding of the motor energized after the armature circuit has been opened.

6. In a controller for electric motors, in combination, means controllable from a distant point for controlling both the armature circuit and the shunt field circuit of the motor, said means tending to open the shunt field circuit upon the opening of the armature circuit, and means for establishing a dynamic braking circuit for the motor and maintaining the shunt field winding of the motor energized after the armature circuit has been opened for dynamic braking and then automatically disconnecting the same from circuit.

7. In a controller for electric motors, in combination, a pair of electroresponsive switches for controlling the armature circuit and the shunt field circuit of the motor, the field controlling switch tending to open upon the opening of the other switch, and means for establishing a dynamic braking circuit for the motor and for establishing a maintaining circuit for the operating winding of the field controlling switch to retain the same closed after the motor armature has been disconnected from circuit.

8. In a controller for electric motors, in combination, a pair of electroresponsive switches for controlling the armature circuit and the shunt field circuit of the motor, the field controlling switch tending to open upon the opening of the other switch, and means for establishing a dynamic braking circuit for the motor and for establishing a maintaining circuit for the operating winding of the field controlling switch to retain the same closed after the motor armature has been disconnected from circuit, said means being arranged to interrupt said maintaining circuit to permit said field controlling switch to open when the motor has been brought to rest.

9. In a controller for electric motors, in combination, an electroresponsive switch for controlling the circuit of the shunt field winding of the motor, an electroresponsive switch for establishing a dynamic braking circuit for the motor, said braking switch having an operating winding adapted to be connected across the terminals of the motor armature to respond to the counter electromotive force thereof, and a switch operable with said braking switch for establishing a maintaining circuit for the shunt field controlling switch during the dynamic braking period.

10. In a controller for electric motors, in combination, an electroresponsive switch for establishing a dynamic braking circuit for the motor, means controllable from a distant point for slowing down the motor and then automatically connecting the operating winding of said switch across the terminals of the motor armature, an electroresponsive switch for controlling the circuit of the shunt field winding of the motor and tending to disconnect the shunt field winding from circuit when the armature is disconnected from circuit, and a switch operable with said dynamic braking switch for maintaining said field controlling switch energized during the dynamic braking period.

11. In a controller for electric motors, in combination, electroresponsive switches for controlling both the armature circuit and the shunt field circuit of the motor, electroresponsive means for establishing a dynamic braking circuit for the motor, a master switch for controlling said switches and said means, and means automatically operated upon the establishment of the dynamic braking circuit for rendering said master switch ineffective to cause the field controlling switch to disconnect the shunt field winding from circuit.

12. In a controller for electric motors, in combination, electroresponsive switches for controlling both the armature circuit and the shunt field circuit of the motor, electroresponsive means for establishing a dynamic braking circuit for the motor, a master switch for controlling said switches and said means, and means automatically operated upon the establishment of the dynamic braking circuit for rendering said master switch ineffective to cause the field controlling switch to disconnect the shunt field winding from circuit, said last mentioned means tending to cause the deënergization of the field controlling switch to open the shunt field circuit when the motor is brought to rest.

13. In a controller for electric motors, in combination, means controlling the armature circuit, and means controlling the shunt field circuit, both of said means being controllable from a distant point, said first mentioned means being ineffective to close the armature circuit until said second mentioned means has been operated to close the shunt field circuit of the motor.

14. In a controller for electric motors, in combination, a pair of switches controllable from a distant point, both of said switches being included in the armature circuit of the motor, and one of said switches being included in the shunt field circuit thereof, either of said switches being adapted to disconnect the motor armature from circuit.

15. In a controller for electric motors, in combination, an electroresponsive main switch, and an electroresponsive auxiliary main switch, both of said switches being included in the armature circuit, and said auxiliary switch being included in the shunt field circuit of the motor.

16. In a controller for electric motors, in combination, an electroresponsive main switch, and an electroresponsive auxiliary main switch, both of said switches being included in the armature circuit, and said auxiliary switch being included in the shunt field circuit of the motor, and a switch operable with said main switch for controlling the circuit of the operating winding of said auxiliary switch.

17. The combination with a motor having a shunt field winding, of means for automatically connecting and disconnecting the shunt field winding from circuit, and means insuring against closure of the armature circuit prior to closure of the shunt field circuit and rendering the disconnection of the shunt field winding subject to control by said motor.

18. The combination with a motor having a shunt field winding, of means for automatically disconnecting the field winding from circuit when the motor is stopped and means for automatically closing and opening a dynamic braking circuit for the motor, said first mentioned means insuring the retention of the shunt field winding in circuit until said second mentioned means operates to open said dynamic braking circuit.

19. In a controller for a motor having a shunt field winding, in combination, means for automatically closing and opening a dynamic braking circuit for the motor, means for automatically disconnecting the shunt field winding of the motor from circuit when the motor is stopped, said means being interlocked to prevent operation of said second mentioned means to disconnect the shunt field winding from circuit except when said first mentioned means is in position to open said dynamic braking circuit.

20. The combination with a motor having a shunt field winding, of means controllable from a distant point for controlling the continuity of the shunt field circuit, said means insuring disconnection of the motor armature from circuit upon opening the shunt field circuit and insuring energization of the shunt field winding upon closure of the armature circuit.

21. The combination with a motor having a shunt field winding, of means controllable from a distant point for controlling the continuity of the shunt field circuit, said means insuring disconnection of the motor armature from circuit upon opening the shunt field circuit and insuring energization of the shunt field winding upon closure of the armature circuit, and means controlling said first mentioned means to maintain the shunt field winding energized until the motor is substantially brought to rest and then automatically disconnecting the shunt field winding from circuit.

In witness whereof, I have hereunto subscribed my name in the presence of two witnesses.

THOMAS E. BARNUM.

Witnesses:
FRANK H. HUBBARD,
WALTER E. SARGENT.